Patented June 19, 1923.

1,459,699

UNITED STATES PATENT OFFICE.

JOSEPH VAN RUYMBEKE, OF MARSEILLE, FRANCE.

PRODUCTION OF ALCOHOL.

No Drawing.    Application filed August 15, 1921. Serial No. 492,466.

*To all whom it may concern:*

Be it known that I, JOSEPH VAN RUYM-BEKE, a subject of the King of Belgium, residing at Les Tamaris, Vieille-Chapelle, Marseille, in the Republic of France, have invented certain new and useful Improvements in or Relating to the Production of Alcohol, of which the following is a specification.

This invention relates to an improved process for the production of alcohol of high strength say about 98–99 per cent, by means of distillation or rectification. It is known that the usual rectifying plant can not produce alcohol of a strength much greater than 93 per cent and alcohol of a higher strength can be obtained only by special and somewhat costly methods.

According to this invention I distill alcohol in the presence of glycerine, which acts as a dehydrating agent with the result that the alcohol obtained from the distillation apparatus or rectifying column is of considerably increased concentration.

I prefer to distill the alcohol in a rectifying column through which flows a counter current of glycerine. By suitably regulating the rates of flow of the glycerine and the alcohol vapour the alcohol leaving the column when condensed and cooled in the usual manner, attains a strength of about 98 to 99 per cent. The glycerine which flows to the bottom of the column carries both water and alcohol and the alcohol can be recovered in a second rectifying column by injecting steam at the base, the recovered alcohol passing again to the primary rectifying apparatus. The glycerine from the bottom of the second rectifying column is free from alcohol, but is diluted with water and can be concentrated in the usual manner so as to be ready for further use.

The cycle of operations above described can be carried out in a separate plant starting from the 92 to 93 per cent alcohol obtained by the usual rectifying process, or the plant for the glycerine process can form part of existing rectifying plant, in which case it is possible to save the heat necessary to vaporize the alcohol in the ordinary apparatus by condensing only the alcohol which has to be returned to the ordinary continuous rectifying column in order to keep the various plates at the necessary strength, leaving the remaining alcohol vapor to go to the column down which the glycerine flows. The alcohol vapor recovered from the diluted glycerine can be directly returned to the primary rectifying column of the ordinary apparatus. In the case of discontinuous plant the additional rectifying plant employing glycerine may also be arranged to operate in conjunction with the ordinary plant.

The apparatus employed is of the ordinary character and requires no illustration and the temperatures involved in the process are the ordinary temperatures of rectification. The rate at which glycerine is supplied in a counter current to the rectifying column depends upon the strength of the alcohol required, the amount of water to be removed and the rate of distillation. For example, in a rectifying column adapted to give a production of alcohol of 1000 litres per hour of 98–99 per cent strength the supply of glycerine to the top of the column may amount to about 1000 litres per hour.

What I claim and desire to secure by Letters Patent of the United States is:—

1. A process for the production of alcohol of high strength consisting in bringing alcohol vapours into contact with glycerine in a rectifying column, the said glycerine acting as a dehydrating agent.

2. A process for the production of alcohol of high strength consisting in distilling the alcohol in a rectifying column and passing a counter-current of glycerine down said rectifying column at a predetermined rate.

3. A process for the production of alcohol of high strength consisting in distilling the alcohol in the presence of glycerine, separating the aqueous solution of glycerine and alcohol which flows to the bottom of the rectifying column, subjecting the said aqueous solution to a second distillation to recover the alcohol, returning the recovered alcohol to the primary distillation apparatus concentrating the aqueous solution of glycerine to remove the water and thereafter employing the glycerine so recovered in the primary alcohol distillation apparatus.

4. A process for the production of alcohol of high strength consisting in distilling the alcohol by the ordinary process with an ordinary rectifying column, condensing part of the alcohol vapour produced and returning it to the said ordinary rectifying column passing the remainder of the alcohol vapour without condensation into the rectifying column of a second apparatus, and treating the said alcohol vapour with glycerine in the rectifying column of the second apparatus.

5. A process for the production of alcohol of high strength consisting in distilling the alcohol by the ordinary process with an ordinary rectifying column condensing part of the alcohol vapour produced and returning it to said ordinary rectifying column, passing the remainder of the alcohol vapour without condensation into the rectifying column of a second apparatus, subjecting the alcohol vapour to treatment with glycerine by passing a counter-current of glycerine at a predetermined rate down the rectifying column of the second apparatus separating the aqueous solution of glycerine and alcohol which flows to the bottom of the rectifying column of said second apparatus subjecting said aqueous solution to a further distillation to recover the alcohol, returning the recovered alcohol to the ordinary distillation apparatus, concentrating the aqueous solution of glycerine to remove the water, and thereafter employing the glycerine so recovered in the rectifying column of said second apparatus.

6. The process of producing alcohol of strength 98 to 99 per cent by bringing alcohol vapours into contact with glycerine in a rectifying column, the said glycerine acting as a dehydrating agent.

JOSEPH VAN RUYMBEKE.

Witnesses:
A. MACFARLANE,
D. C. WOODS.